(12) United States Patent
Woo et al.

(10) Patent No.: US 11,906,152 B2
(45) Date of Patent: Feb. 20, 2024

(54) PILLOW

(71) Applicants: Sung Jong Woo, Seoul (KR); Kyung A Do, Seoul (KR)

(72) Inventors: Sung Jong Woo, Seoul (KR); Kyung A Do, Seoul (KR)

( * ) Notice: Subject to any disclaimer, the term of this patent is extended or adjusted under 35 U.S.C. 154(b) by 0 days.

(21) Appl. No.: 18/017,095

(22) PCT Filed: Jul. 5, 2021

(86) PCT No.: PCT/KR2021/008519
§ 371 (c)(1),
(2) Date: Jan. 20, 2023

(87) PCT Pub. No.: WO2022/019525
PCT Pub. Date: Jan. 27, 2022

(65) Prior Publication Data
US 2023/0296241 A1    Sep. 21, 2023

(30) Foreign Application Priority Data
Jul. 21, 2020    (KR) .................. 10-2020-0090239

(51) Int. Cl.
*F21V 33/00* (2006.01)
*A47G 9/10* (2006.01)
*F21V 8/00* (2006.01)
*A47G 9/00* (2006.01)

(52) U.S. Cl.
CPC ............ *F21V 33/0024* (2013.01); *A47G 9/10* (2013.01); *G02B 6/0005* (2013.01); *A47G 2009/005* (2013.01)

(58) Field of Classification Search
CPC .................. A47G 9/10; A47C 7/725
See application file for complete search history.

(56) References Cited

U.S. PATENT DOCUMENTS

| | | | |
|---|---|---|---|
| 10,646,685 B2* | 5/2020 | Rea | H05B 45/00 |
| 11,209,154 B2* | 12/2021 | Marks | H05B 47/115 |
| 2009/0109661 A1* | 4/2009 | Holderman | A47C 7/725 362/131 |
| 2010/0052381 A1* | 3/2010 | Tingley | A61B 5/6887 297/217.3 |
| 2014/0223664 A1* | 8/2014 | Kanbar | A47G 9/10 5/636 |
| 2017/0202377 A1* | 7/2017 | Jones | A47G 9/1045 |

(Continued)

FOREIGN PATENT DOCUMENTS

| | | |
|---|---|---|
| CN | 202908370 U | 5/2013 |
| CN | 110558937 A | 12/2019 |

(Continued)

OTHER PUBLICATIONS

International Search Report for PCT/KR2021/008519 dated Oct. 13, 2021 from Korean Intellectual Property Office.

*Primary Examiner* — Eric T Eide
(74) *Attorney, Agent, or Firm* — Revolution IP, PLLC

(57) ABSTRACT

A pillow includes: a body having a filler, consisting of bundles of fibers, filled inside a covering having a space therein; a printed pattern formed on the upper surface of the covering; and a light-emitting means which is installed in the body and which emits light towards the covering, on which the printed pattern is formed, so as to allow the printed pattern to produce an aesthetic effect.

5 Claims, 3 Drawing Sheets

(56) References Cited

U.S. PATENT DOCUMENTS

2017/0215608 A1* 8/2017 Moss ........................ A63H 3/28
2021/0353083 A1* 11/2021 Ali ....................... A47G 9/1045

FOREIGN PATENT DOCUMENTS

| JP | 2006-198082 A | 8/2006 |
| JP | 3153194 U | 8/2009 |
| KR | 20-0396536 Y1 | 9/2005 |
| KR | 10-2016-0006459 A | 1/2016 |

* cited by examiner

PILLOW

CROSS REFERENCE TO PRIOR APPLICATIONS

This application is the 35 U.S.C. 371 national stage of International application PCT/KR2021/008519 filed on Jul. 5, 2021; which claims priority to Korean Patent Application No. 10-2020-0090239 filed on Jul. 21, 2020. The entire contents of each of the above-identified applications are hereby incorporated by reference.

TECHNICAL FIELD

The present invention relates to a pillow that enables identification of the shapes of actual images or characters printed on the pillow among bedding even in a dark situation where light is turned off.

BACKGROUND ART

In general, various patterns are formed on the surface of bedding through a printing process, or a fabric having a pattern formed during weaving is used to improve marketability. Recently, the shapes of actual images or various characters are printed on such bedding to produce a new aesthetic effect. Here, the bedding includes a blanket, a pillow, a mat cover, a cushion, and the like.

On the other hand, various fillers such as cotton are inserted between textile papers constituting the bedding for the purpose of keeping warm, and a quilting process is often performed in order to prevent excessive swelling of the filler and a phenomenon that the filler leans to one side.

However, in the conventional bedding, an aesthetic effect may be produced because various patterns printed on the surface of the bedding are created in a visible light state. However, since these patterns are not identified at night when light is turned off, the conventional bedding has a limitation in providing an aesthetic effect.

To overcome such a limitation, various patterns have recently been produced on the surface of the bedding by using luminous pigments or luminous yarns. However, if the luminous pigments or luminous yarns are washed several times, the luminous pigments or luminous yarns fall off the surface of the bedding, or the luminous performance is weakened. Accordingly, since this makes the product look crude, there is a problem that degrades the quality of the product.

When various patterns are produced on the surface of the bedding by using luminous pigments or luminous yarns, it has to be dark enough to realize luminous light, and there is a problem in that continuous patterns are produced in a dark state, which interferes with sleep.

Such conventional bedding having luminous performance is disclosed in Korean Utility Model Registration No. 20-0396536 (2005 Sep. 14).

DISCLOSURE

Technical Problem

The present invention is directed to providing a pillow in which patterns such as the shapes of actual images or various characters formed on the surface thereof are stably produced regardless of the degree of darkness, and when sleeping, the appearance of patterns such as the shapes of actual images or various characters is minimized to enable stable sleep.

Technical Solution

The present invention provides a pillow including: a body having a filler, consisting of bundles of fibers, filled inside a covering having a space therein; a printed pattern formed on the upper surface of the covering; and a light-emitting means which is installed in the body and which emits light towards the covering, on which the printed pattern is formed, so as to allow the printed pattern to produce an aesthetic effect.

In addition, the covering may be fabric to allow the light emitted from the light-emitting means to be transmitted through the printed pattern.

In addition, the light-emitting means may be installed on the body so as to be disposed in a center of a covering disposed at a lower side, and when a user presses a portion of a covering disposed at an upper side, the density of the filler may increase and the emission of the light of the light-emitting means towards the printed pattern may be blocked.

In addition, a detachable insertion hole may be formed to pass through the center of the covering disposed at the lower side, and the light-emitting means may include: a substrate portion inserted and disposed inside the body through the detachable insertion hole; a light source installed on the substrate portion and supplied with power to emit light; and a detachable attachment plate coupled and installed so as to extend outward from an edge of the substrate portion, and having hook and loop fastener on the upper surface so as to be detachably attached to the covering disposed at the lower side.

In addition, a plurality of light sources may be installed to be spaced apart from each other at regular intervals around the edge of the upper surface of the substrate portion, and the plurality of light sources may be disposed on the substrate portion to be inclined so that light is emitted towards the central portion of the covering disposed at the upper side.

In addition, the pillow may further include a pressure sensor connected to the light-emitting means inside the body and blocking the emission of the light from the light-emitting means when a pressure is applied thereto.

Advantageous Effects

In a pillow according to the present invention, a printed pattern is formed on a covering of a body filled with a filler, and an aesthetic effect of the printed pattern is produced while a light-emitting means disposed inside the body emits light towards the covering in which the printed pattern is formed. When the body supports a user's head, the density of the filler increases and the emission of the light of the light-emitting means towards the printed pattern is blocked, thereby avoiding disturbing the user's sleep.

MODES OF THE INVENTION

Hereinafter, preferred embodiments of the present invention will be described in detail with reference to the accompanying drawings.

Figure 1:
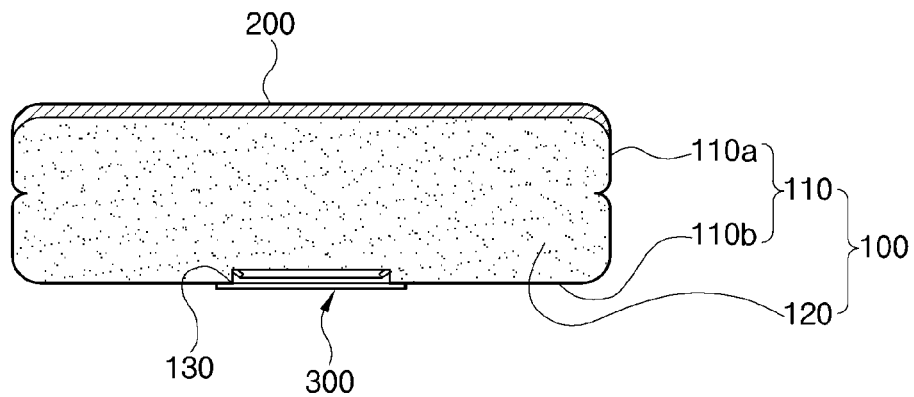
FIG. 1 is a structural cross-sectional view of a pillow according to an embodiment of the present invention.
Figure 2:
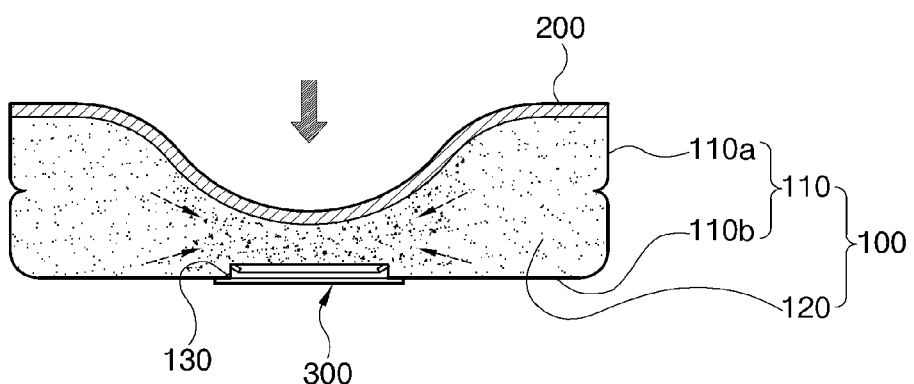
FIG. 2 is a state diagram when a pressure is applied to the pillow according to an embodiment of the present invention.

FIG. 1 is a structural cross-sectional view of a pillow according to an embodiment of the present invention, and FIG. 2 is a state diagram when a pressure is applied to the pillow according to an embodiment of the present invention. Referring to FIGS. 1 and 2, the pillow of one embodiment includes a body 100, a printed pattern 200, and a light-emitting means 300.

The body 100 is a part that provides comfort while supporting a user's head when a user sleeps or lies down. The body 100 includes a covering 110 having a space therein, and a filler 120 filled in the space formed inside the covering 110. At this time, the covering 110 may have a structure such that the space is formed therein while fixing the outer edge portions of a pair of vertically stacked coverings 110a and 110b in an abutting state by sewing or by using a binder, but the present invention is not limited thereto. Of course, the covering 110 may be formed so as to surround the filler 120 with one covering. Here, the covering 110 is preferably a woven paper that enables the printed pattern 200 to be produced so that the light of the light-emitting means 300 to be described below is stably emitted to the printed pattern 200. The filler 120 is filled inside between the coverings 110 to support the user's head with a cushioning feeling. Here, the filler 120 uses bundles of fibers so that the light emitted from the light-emitting means 300 is stably transmitted towards the printed pattern 200. In this case, the bundles of fibers may be a mixture of one or more of vegetable fibers, animal fibers, mineral fibers, or chemical fibers.

A detachable insertion hole 130 may be formed to pass through the center of the covering 110b disposed at the lower side of the body 100. The detachable insertion hole 130 allows the light source 320 of the light-emitting means 300 to be described below to be inserted and disposed inside the body 100, so that the light generated by the light source 320 may be emitted to the printed pattern 200.

The printed pattern 200 is a part that provides an aesthetic effect on the surface of the covering 110 by the light emitted from the light-emitting means 300. The printed pattern 200 is formed on an outer surface of a covering 110a disposed at the upper side of the covering 110 through a textile printer. In this case, the printed pattern 200 may select and apply various patterns in addition to actual images or characters.

The light-emitting means 300 may emit the light towards the printed pattern 200 so that the aesthetic effect of the printed pattern 200 is produced. The light-emitting means 300 is installed at one side of the body 100, more specifically, the covering 110b disposed at the lower side among the pair of coverings 110, so that the light generated by the supply of power is emitted towards the upper covering 110a on which the printed pattern 200 is formed. At this time, more preferably, the light-emitting means 300 is installed to be disposed in the detachable insertion hole 130 of the body 100 so as to be disposed in the center of the inner surface of the covering 110b disposed at the lower side. Therefore, when the user applies a pressure to the body 100 while supporting the user's head on the covering 110a disposed at the upper side, the density of the filler 120 in the body 100 is increased. Due to this, it is possible to prevent the light emitted from the light-emitting means 300 from being transmitted towards the printed pattern 200, thereby preventing disturbing the user's sleep by light in a state where the user's head is supported.

Figure 3:
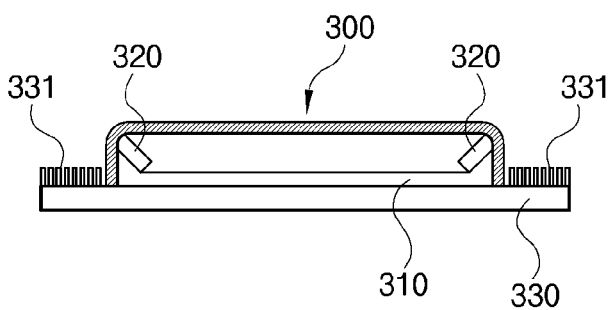
FIG. 3 is an enlarged cross-sectional view of a light source means illustrated in FIG. 1.
Figure 4:
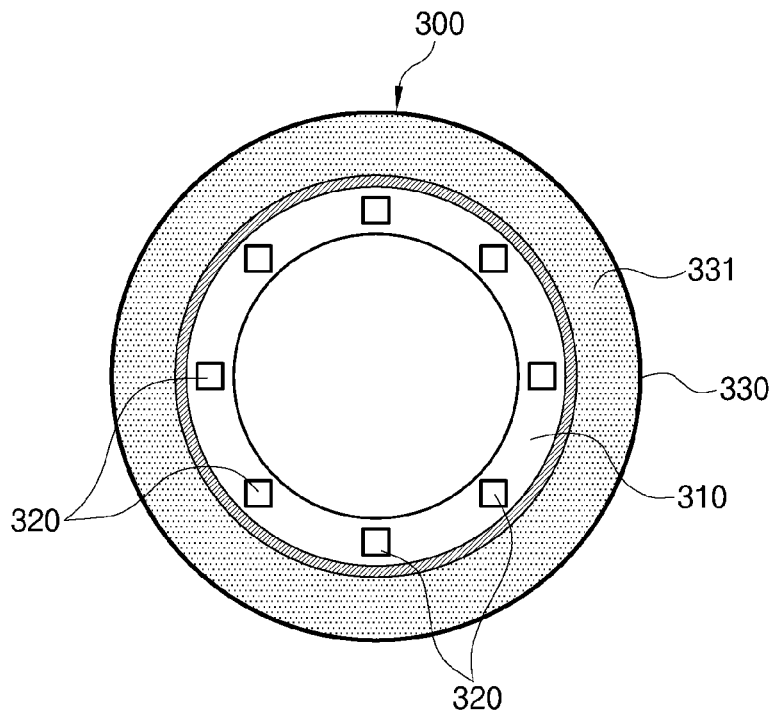
FIG. 4 is a plan view of the light source means illustrated in FIG. 1.
Figure 5:
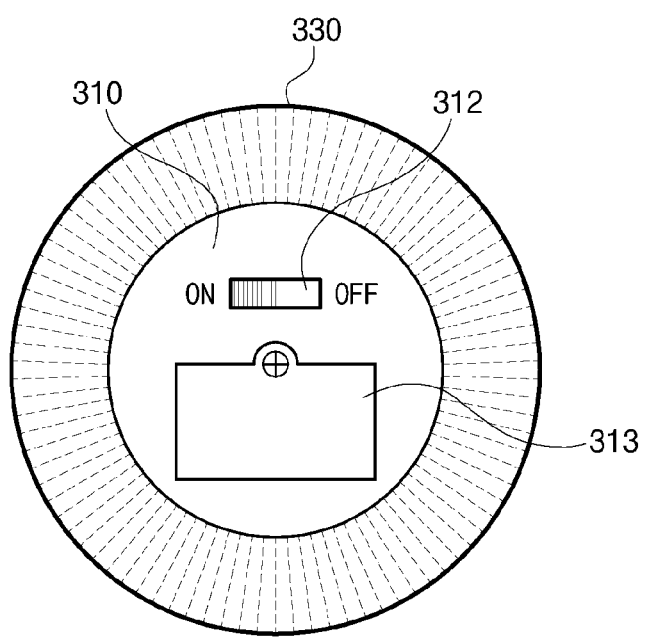
FIG. 5 is a rear view of the light source means illustrated in FIG. 1.

Referring to FIGS. 3 to 5, the light-emitting means 300 includes a substrate portion 310, a light source 320, and a detachable attachment plate 330. The substrate portion 310 is a substrate on which the light source 320 to be described below is installed. The upper portion of the substrate portion 310 is disposed to be inserted into the body 100 through the detachable insertion hole 300, so that the light generated by the light source 320 is emitted towards the printed pattern 200. Here, the substrate portion 310 is illustrated as having a circular plate shape, but the present invention is not limited thereto. Of course, the substrate portion 310 may be formed in various plate shapes. A transparent window 311 may be provided on the substrate portion 310 to transmit the light of the light source 320 and to protect the light source 320. A power supply means (not illustrated) for supplying power to the light source 320 and a power switch 312 capable of controlling whether to supply power from the power supply means to the light source 320 may be formed inside the substrate portion 310. Here, the power supply means may be a battery, but the present invention is not limited thereto. The power supply means may be connected to a smartphone through a cable to receive power from the battery of the smartphone. At this time, a power supply accommodation portion (not illustrated) for accommodating the power supply means may be formed in the substrate portion 310, and a power supply lid 313 for opening and closing the power supply accommodation portion may be provided therein.

The light source 320 is a part that generates light when receiving power from the power supply means. Here, the light source 320 may be a light-emitting diode (LED), but the present invention is not limited thereto. The light source 320 is coupled and installed on the upper surface of the substrate portion 310. More preferably, a plurality of light sources 320 are installed spaced apart from each other at regular intervals around the edge of the upper surface of the substrate portion 310. At this time, the plurality of light sources 320 are installed to be disposed on the substrate portion 310 in an inclined state, so that light is emitted to the central portion of the covering 110a disposed at the upper side. Here, the light source 320 may selectively emit light of various colors, so that the effect of the printed pattern 200 produced by the light of the light source 320 may be different.

The detachable attachment plate 330 is a part that detachably attaches the substrate portion 310 to the body 100. The detachable attachment plate 330 is coupled and installed to extend outward from the edge of the substrate portion 310. Hook and loop fastener 331 is formed on the upper surface of the detachable attachment plate 330 so as to be detachably attached to the outer surface of the covering 110b disposed at the lower side.

Figure 6:
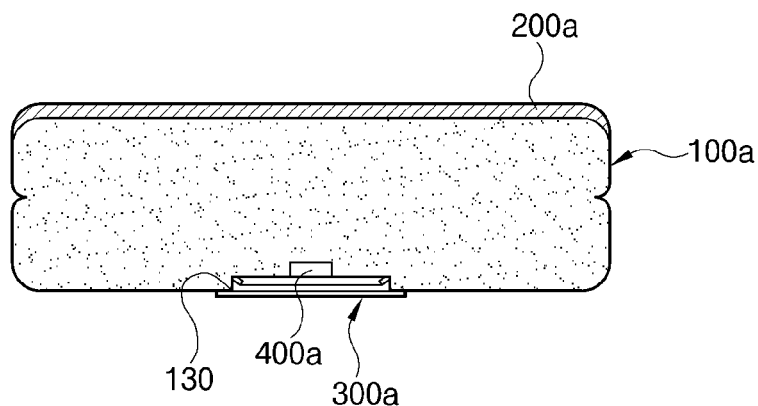
FIGS. 6 and 7 are structural cross-sectional views of a pillow according to another embodiment of the present invention.

FIG. 6 is a structural cross-sectional view of a pillow according to another embodiment of the present invention. Referring to FIG. 6, the pillow includes a body 100a, a printed pattern 200a, a light-emitting means 300a, and a pressure sensor 400a. In this case, since the configuration of the body 100a, the printed pattern 200a, and the light-emitting means 300a is the same as the configuration of the body 100, the printed pattern 200, and the light-emitting means 300 of the pillow according to the embodiment described above, detailed descriptions thereof will be omitted and only the configuration of the pressure sensor 400a will be described.

The pressure sensor 400a is a sensor which, when the user's head is supported on the upper side of the body 100a and a pressure of a certain strength or more is applied, blocks the emission of light from the light-emitting means 300a while blocking the supply of power to the light-emitting means 300a. The pressure sensor 400a is connected to the light-emitting means 300a in a state of being inserted into the body 100a.

Figure 7:
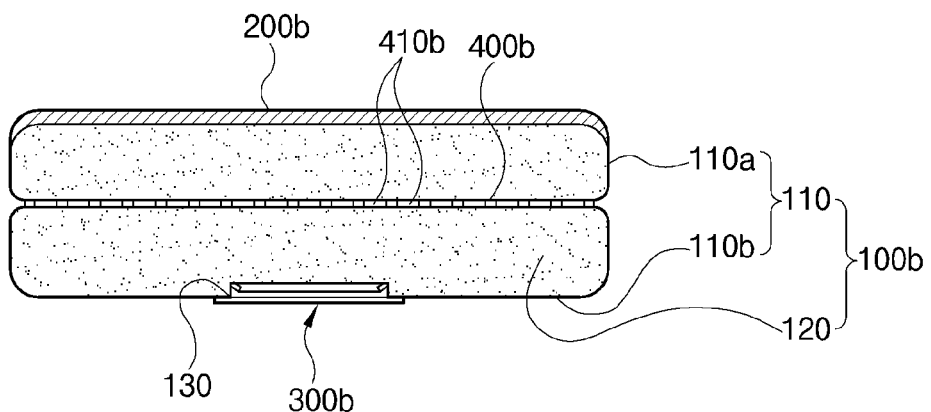

FIG. 7 is a structural cross-sectional view of a pillow according to further another embodiment of the present invention. Referring to FIG. 7, the pillow includes a body 100b, a printed pattern 200b, a light-emitting means 300b, and an auxiliary blocking plate 400b. In this case, since the configuration of the body 100b, the printed pattern 200b, and the light-emitting means 300b is the same as the configuration of the body 100, the printed pattern 200, and the light-emitting means 300 of the pillow according to the embodiment described above, detailed descriptions thereof will be omitted and only the configuration of the auxiliary blocking plate 400b will be described.

The auxiliary blocking plate 400b is installed to be disposed inside the body 100b, that is, between the covering 110a disposed at the upper side and the covering 110b disposed at the lower side. At this time, the outer edge portion of the auxiliary blocking plate 400b may be coupled to the outer edge portions of the coverings 110a and 100b to abut the pair of coverings 110a and 110b. The auxiliary blocking plate 400b is made of a rubber or synthetic resin material having elasticity and ductility in order to increase the cushioning feeling. A plurality of through-holes 410b are formed to be spaced apart from each other, so that the light generated by the light-emitting means 300b is emitted to the printed pattern 200b while passing through the through-holes 410b. Therefore, when a load is applied to the body 100b while supporting the user's head, the auxiliary blocking plate 400b is also pressed, the through-holes 410b are deformed to become narrower, and the emission of the light of the light-emitting means 300b towards the printed pattern 200b may be minimized. At this time, the auxiliary blocking plate 400b may be configured by stacking a plurality of plate bodies having a plurality of through-holes 410b formed therein so that, when the load is applied while increasing the cushioning feeling, the emission of the light of the light-emitting means 300b towards the printed pattern 200b is more stably blocked.

As such, in the pillow according to an embodiment, the printed pattern 200 is formed on the covering 110 of the body 100 filled with the filler 120, and the aesthetic effect of the printed pattern 200 is produced while the light-emitting means 300 disposed inside the body 100 emits the light towards the covering 110 in which the printed pattern 200 is formed. When the body 100 supports the user's head, the density of the filler 120 increases and the emission of the light of the light-emitting means 300 towards the printed pattern 200 is blocked, thereby avoiding disturbing the user's sleep.

The present invention has been described with reference to the embodiments illustrated in the drawings, but this is only an example. It will be understood by those of ordinary skill in the art that various modifications and variations may be made thereto. Accordingly, the true technical protection scope of the present invention should be defined by the technical spirit of the appended claims.

The invention claimed is:

1. A pillow comprising:
a body having a filler, consisting of bundles of fibers, filled inside a covering having a space therein;
a printed pattern formed on the upper surface of the covering;
a light-emitting means which is installed in the body and which emits light towards the covering, on which the printed pattern is formed, so as to allow the printed pattern to produce an aesthetic effect; and
a pressure sensor connected to the light-emitting means inside the body and blocking the emission of the light from the light-emitting means when a pressure is applied thereto.

2. The pillow of claim 1, wherein the covering is fabric to allow the light emitted from the light-emitting means to be transmitted through the printed pattern.

3. The pillow of claim 1, wherein the light-emitting means is installed on the body so as to be disposed in a center of the covering disposed at a lower side, and when a user presses a portion of the covering disposed at an upper side, the density of the filler increases and the emission of the light of the light-emitting means towards the printed pattern is blocked.

4. The pillow of claim 1, wherein a detachable insertion hole is formed to pass through the center of the covering disposed at the lower side, and
the light-emitting means comprises:
a substrate portion inserted and disposed inside the body through the detachable insertion hole;
a light source installed on the substrate portion and supplied with power to emit light; and
a detachable attachment plate coupled and installed so as to extend outward from an edge of the substrate portion, and having hook and loop fastener on the upper surface so as to be detachably attached to the covering disposed at the lower side.

5. The pillow of claim 4, wherein a plurality of light sources are installed to be spaced apart from each other at regular intervals around the edge of the upper surface of the substrate portion, and
the plurality of light sources are disposed on the substrate portion to be inclined so that light is emitted towards the central portion of the covering disposed at the upper side.

* * * * *